United States Patent [19]

Pozsicsányi

[11] 4,401,151

[45] Aug. 30, 1983

[54] DEVICE FOR PUMPING A LIQUID OR GASEOUS CURRENT MEDIUM

[75] Inventor: Wolfgang Pozsicsányi, Schwäbisch Hall, Fed. Rep. of Germany

[73] Assignee: Wilhelm Gebhardt GmbH, Fed. Rep. of Germany

[21] Appl. No.: 171,516

[22] Filed: Jul. 23, 1980

[30] Foreign Application Priority Data

Jul. 26, 1979 [DE] Fed. Rep. of Germany ....... 2930240

[51] Int. Cl.³ .......................... F28F 5/04; F28D 15/00
[52] U.S. Cl. ........................ 165/86; 165/92; 165/104.26; 165/125
[58] Field of Search ............. 165/86, 92, 104.21, 165/104.26, 125, 104.25

[56] References Cited

FOREIGN PATENT DOCUMENTS

| | | | |
|---|---|---|---|
| 595956 | 5/1934 | Fed. Rep. of Germany | 165/92 |
| 2216586 | 3/1973 | Fed. Rep. of Germany | . |
| 2104183 | 4/1975 | Fed. Rep. of Germany | . |
| 2602933 | 7/1976 | Fed. Rep. of Germany | 165/86 |
| 2717203 | 6/1978 | Fed. Rep. of Germany | . |
| 1029831 | 6/1953 | France | . |
| 1197293 | 11/1970 | United Kingdom | . |
| 491016 | 12/1976 | U.S.S.R. | 165/92 |

*Primary Examiner*—Albert W. Davis, Jr.
*Attorney, Agent, or Firm*—Flynn, Thiel, Boutell & Tanis

[57] ABSTRACT

A device for pumping a liquid or gaseous current medium has a casing designed to guide the flow of the current medium and a rotary bearing motor driven rotor wheel designed to pump the current medium through the casing. The rotor wheel is equipped with a number of blades mounted on a shaft or other machine part whose function resembles that of a shaft, the blades being installed one behind the other in series in the direction of circulation. The blades project almost radially outwards in one embodiment and extend over the axial length of the rotor wheel in another embodiment. A partition fitted to the rotor wheel separates the volume flow of the medium pumped through the casing into an incoming pumping medium current, e.g. the inlet air or external air current, and an outgoing pumping medium current, e.g. the expelled air or outgoing air current. At least one heat pipe is fitted permanently to each blade, and rotates with its respective blade. One axial end of the heat pipe is directed toward the incoming pumping medium current, e.g. the inlet air or external air current, and the other axial end of the heat pipe is directed toward the outgoing pumping medium current, e.g. the expelled air or outgoing air current.

11 Claims, 11 Drawing Figures

DEVICE FOR PUMPING A LIQUID OR GASEOUS CURRENT MEDIUM

The invention relates to a device for pumping fluid, namely a liquid or gaseous current medium, with a casing designed to guide the flow of the current medium and a rotary bearing motor-driven rotor wheel designed to pump the current medium through the casing and which is equipped with a number of blades mounted on a shaft or other machine part whose function resembles that of a shaft and installed one behind the other in series in the direction of circulation, the blades projecting almost radially outwards or, alternatively, extending over the axial length of the rotor.

The aim of the present invention is to produce a device of the type described here, which will serve simultaneously as an energy recovery system and in particular as a heat recovery system. The heat exchangers which have been proposed for heat recovery in the past for use in ventilation technology, air conditioning equipment construction and in industrial processing and treatment of exhaust gases have the disadvantage of being very large units. All known heat exchange systems, whether they operate on the "recuperative" or "regenerative" principle or are of a so-called "heat pipe" design have the disadvantage of being complex in construction and of requiring extensive back-up apparatus; e.g. a separate pumping unit of a ventilator or pump design must be connected directly before or after the heat exchanger to drive the medium to be used as an energy carrier in the heat exchanger. It is obvious that systems of this kind involve a complex construction design and complex assembly requirements and involve extensive amounts of floor space with the result that they also tend to be costly. The aim of this invention, on the other hand, is to produce a device of the type described here constituting a compact, reliable, simple and economic heat recovery system, requiring little maintenance and involving no additional energy for the energy transmission process itself.

In order to comply with the above, the invention provides for a device designed to pump a liquid or gaseous current medium with a casing designed to guide the current medium, complete with a rotary bearing motor-driven rotor wheel to pump the current medium through the casing and which is equipped with a number of blades mounted on a shaft or other machine part whose function resembles that of a shaft and installed one behind the other in series in the direction of circulation, the blades projecting almost radially outwards in one embodiment and extending over the axial length of the rotor wheel in another embodiment. A partition located inside the rotor wheel separates the volume flow passing through the casing into an inlet air or external air current and an outgoing air or expelled air current, each of the blades being fitted with at least one permanent heat pipe rotating with its respective blade, such heat pipe having one axial end directed towards the incoming or external air current and the other axial end directed towards the outgoing or expelled air current. At least one heat pipe may, for example, be integrated into the blade, for which purposes it would be practical for it to be housed in the blade; the arrangement may be so designed, for example, that each blade is provided with a number of heat pipes in which case it would be preferable for the heat pipes fitted to each blade to lie parallel with each other.

The resultant construction is relatively inexpensive, since no separate heat exchanger, pumping unit and guide channel systems are necessary, as all these are contained in a single piece of apparatus; other advantages of this invention are its compact construction, minimal space requirements, reduced assembly requirements and above all safety in operation requiring little or no maintenance.

It is possible for the invention to be set up following a radial flow ventilator design, in which the media involved in the heat exchange proceeds are each drawn in centrally in an axial direction and are expelled outwards in a radial direction, for which purposes it would be practical for the heat pipes to be aligned parallel or almost parallel to the rotor's axis of rotation. The invention may also follow a cross flow ventilator design, in which the media involved in the heat exchange process are each drawn inwards in a radial direction and are re-expelled outwards in a radial direction having been redirected inside the rotor wheel, for which purposes it would be practical for the heat pipes to run parallel or almost parallel to the rotor's axis of rotation. Finally, the device may also follow an axial flow ventilators design, in which the media involved in the heat exchange process are drawn inwards in an axial direction but along concentric lines and are expelled outwards in an axial direcion, again along concentric lines, for which purposes it would be practical for the heat pipes to be aligned radially to the rotor's axis of rotation. Finally, the device may be of a radial or axial flow pump design, acting as a pump for fluid media with simultaneous energy recovery.

The drawings show various possible constructions for the apparatus relating to this invention. They represent:

FIG. 1A is a view similar to FIG. 1 but showing the fan (and hence the impeller thereof) tilted.

FIGS. 7, 8, 9 and 10 are various possibilities for the design constructions of the blades relating to the construction designs shown in FIGS. 1 to 6.

Figure 1:
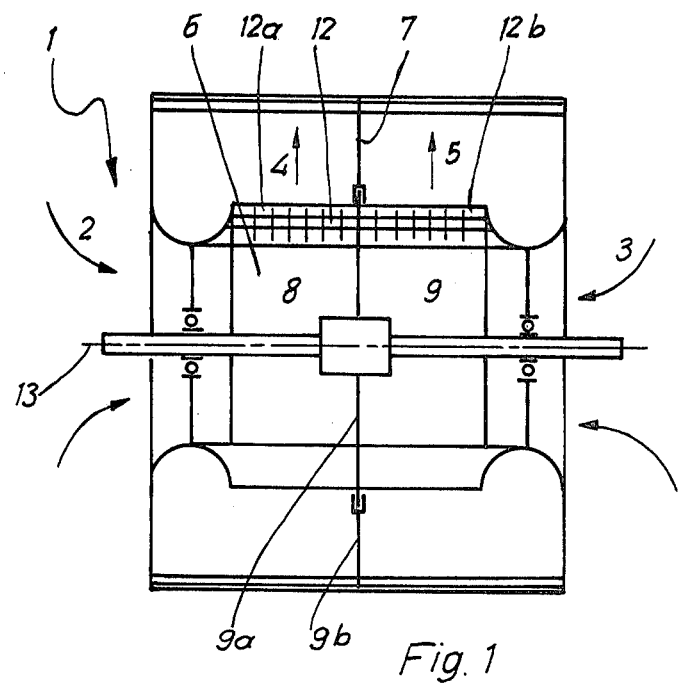
FIG. 1 is a first design relating to the invention, a radial flow ventilator—front view—diagrammatic section.
Figure 2:
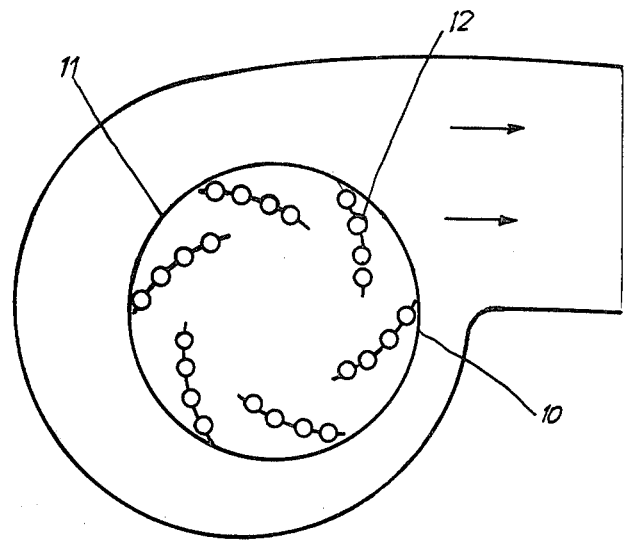
FIG. 2 is a layout as in FIG. 1—side view.

The construction types illustrated in FIGS. 1 and 2 represent a radial flow ventilator 1, in which the media involved in the heat exchange process are drawn in centrally in an axial direction as shown by arrows 2 and 3, whereby the two media flow currents enter in opposite directions (arrows 2 and 3) and are expelled from the rotor wheel in a radial direction as shown by arrows 4 and 5. We are therefore dealing with a double-flow ventilator set-up. According to the parameters of the invention, it is proposed that the volume flow of the pumping medium drawn through the device's housing should be separated by a partition (7)—a dividing wall—having a portion located within the rotor wheel (6), into an inlet air or external air current (8) and an expelled air or outgoing air current (9) and that there should be at least one, but preferably several, heat pipes

(12) permanently attached to the blades (10, 11) etc., each of which rotates with its respective blade, having one axial end 12a directed towards the inlet air or external air current and the other axial end 12b directed towards the outgoing air or expelled air current. The dividing wall runs at right angles to the longitudinal axis of the rotor wheel (13) separating the space within the casing into an inlet air or external air section (8) and an expelled air or outgoing air section (9). The heat pipes are installed parallel or almost parallel to the rotor's axis of rotation and the heat pipes fitted to each individual blade run parallel with each other. These heat pipes are either integrated into the blade or housed in the blade. FIGS. 7 to 10 illustrate possible design examples for connections between the heat pipes and the blades; these include designs in which the heat pipes are distributed evenly along the width of the blade.

Figure 7:
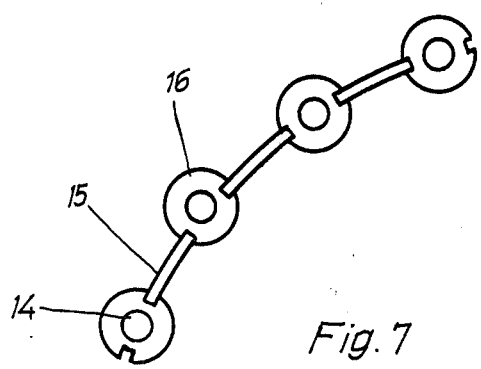
FIG. 7 is a layout as in FIG. 5—side view.
Figure 8:
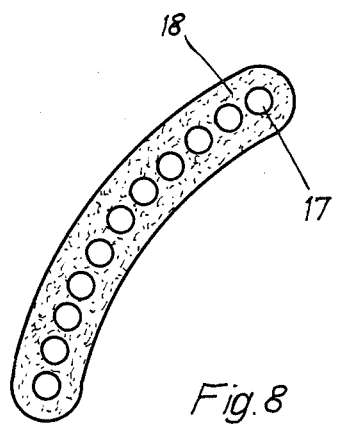
Figure 9:
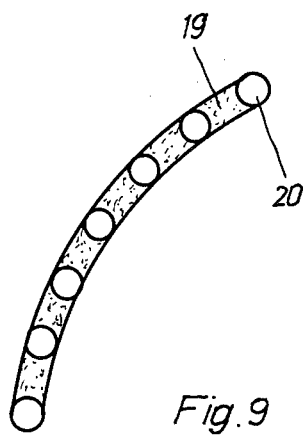
Figure 10:
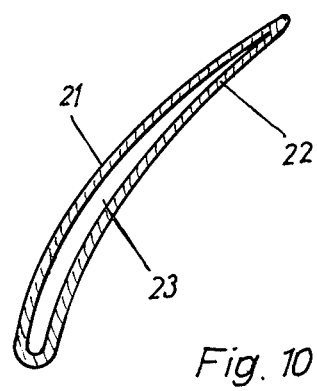

FIG. 7 shows a design in which the heat pipes (14) interrupt the body of the blade (15)—ribbing (16) is provided to increase the intensity of the heat exchange process. FIG. 8 shows a design in which the heat pipes (17) are housed in the body of the blade (18) which may, for example, be constructed of foam plastic. FIG. 9 shows a design whose parameters include the hollow profile blade body (19), containing the heat pipes (20). In all of these designs, both axial ends of the heat pipes are hermetically sealed, using a well known method, to form a closed pipe section, fitted with a porous inner lining with interlinking open central apertures, e.g. of metallic sinter, metallic or textile felt-like material, several layers of fine mesh filter grid etc. and filled with a precisely measured quantity of a liquid working substance in relation to its capacity. It is known that the liquid and steam vapour of the working substance are in phase equilibrium at all operating temperatures. If one end of the pipe section, which may be designed as a ribbed pipe for practical reasons, comes into contact with a current of warm air, a portion of the liquid working substance which is in equilibrium with the steam evaporates; the steam then flows to the opposite end of the pipe which is in contact with a colder air current at which point it condenses, releasing a certain quantity of evaporation heat previously absorbed. The temperature level of the working substance, that is, the condensation and evaporation temperatures should be set in such a way as to create a balance between heat absorption and release within the system. FIG. 10 shows a design in which the entire body of the blade (21) is constructed as a heat pipe; it constitutes a fully hermetically sealed hollow profile unit, fitted with a porous inner lining (22), e.g. of metallic sinter, metallic or textile felt-like material, several layers of fine mesh filter grid etc. and filled with a precisely measured quantity of a liquid working substance (23) in relation to its capacity.

The radial flow ventilator shown in FIG. 1 pumps air by rotation as shown by arrows 2 and 4, whereby this air, which may be warm, releases heat into the medium contained in the heat pipes (12) inside the blade, which in turn re-release heat into the pumping medium, which is being pumped in the second section of the double-flow ventilator as shown by arrows 3 and 5, as described above. The system ensures good heat transport and heat exchange simply and inexpensively.

Figure 3:
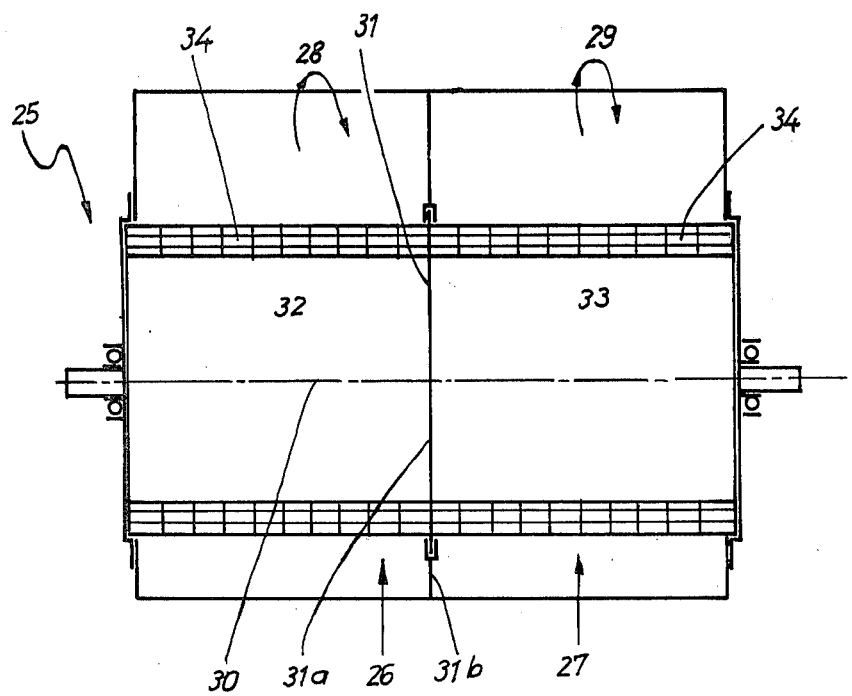
FIG. 3 is a second design relating to the invention, a cross flow ventilator, again a front view diagrammatic section.
Figure 4:
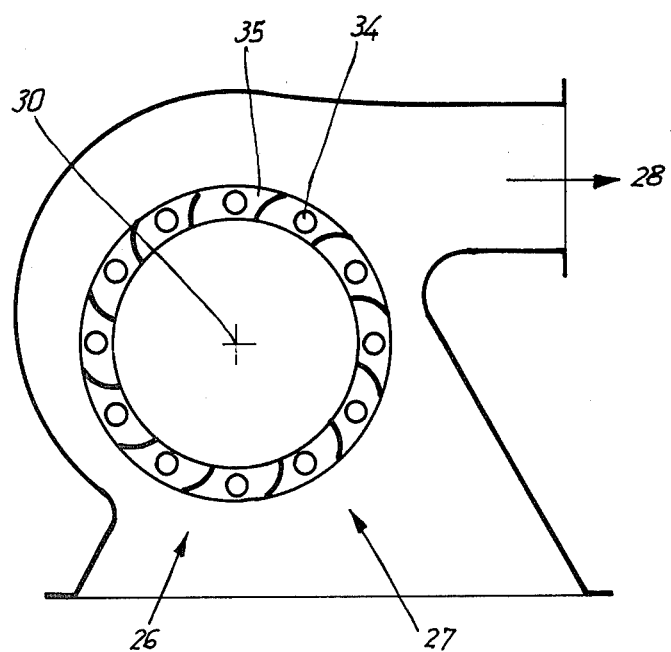
FIG. 4 is a layout as in FIG. 3—side view.

FIGS. 3 and 4 show a device of a cross flow ventilator design as described above, in which the media involved in the heat exchange process are drawn in radially as indicated by arrows 26 and 27 to be expelled from the rotor wheel in a radial direction as indicated by arrows 28 and 29 following redirection inside the rotor wheel. The said cross flow ventilator is also of a double-flow design, whereby the space inside the fan housing and the rotor wheel is separated by a dividing wall (31) running at right angles to the longitudinal axis of the rotor (30) into an inlet air or external air section and an outgoing air or expelled air section (32 and 33 respectively). Here too the heat pipes (34) lie parallel or almost parallel to the rotor's axis of rotation (35). They may be permanently attached to the blades, integrated into the blades or installed between the blades—although the latter case would create disturbance in the current flow—they must circulate with the rotor wheel and with the respective rotor wheel blade.

In both cases—that of the radial flow ventilator as shown in FIGS. 1 and 2 and that of the cross flow ventilator as shown in FIGS. 3 and 4—the dividing wall is level (i.e. flat) or almost level and is of a disk design. In both cases, the dividing wall (7 or 31) consists of a central section (9a or 31a) which rotates with the rotor wheel being located over the circumference of the rotor in a radial direction and of an outer section (9a or 31b) which surrounds it, whose outer circumference is attached to the inside of the casing (the quality of the seal on the outer radius may be increased considerably by using a lamellar seal) and whose inner circumference overlaps the outer circumference of the central section, e.g. by enclosing it in a labyrinth type seal. Generally speaking, this dividing wall is located in the centre of the double-low rotor wheel, but it may be located away from the centre for reasons connected with thermodynamics.

Figure 5:
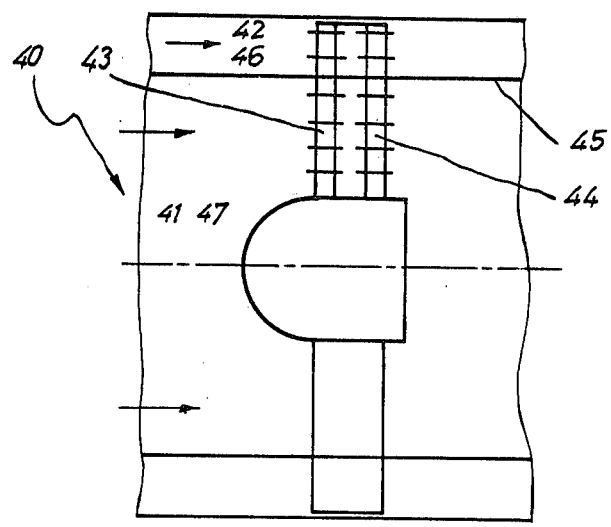
FIG. 5 is a third design relating to the invention, an axial flow ventilator—front view—diagrammatic section.
Figure 6:
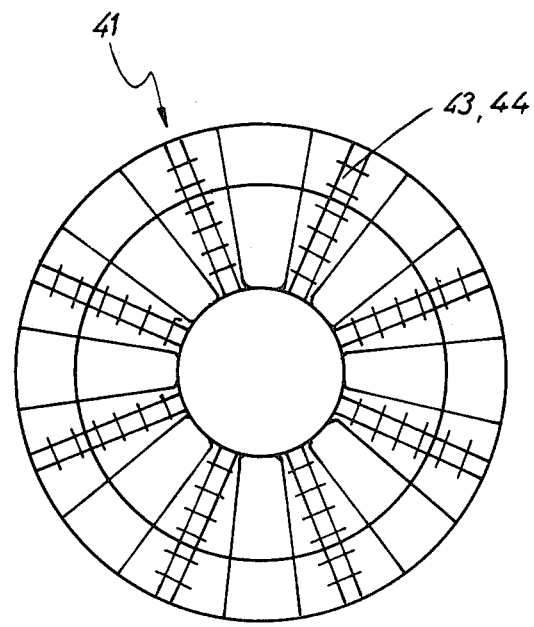

FIGS. 5 and 6 show a design incorporating an axial flow ventilator 40, which may be of a double-flow design and in which the media involved in the heat exchange process are drawn in axially as shown by the arrows (41 and 42) along concentric lines and are expelled outwards axially as shown by the arrows (41 and 42). The inlet air or external air current and the outgoing air or expelled air current are cylindrical and concentric with each other, one surrounding the other; the flow currents may be chosen to run in opposite directions. The heat releasing air current should be situated on the outside to create positive flow. Whereas in the first two designs—radial and cross flow ventilators—the heat pipes run parallel to the longitudinal axis of the rotor wheel, here the heat pipes (43 and 44) are installed radially to the axis of rotation of the rotor wheel. A dividing wall (45) is installed to separate the space inside the fan housing and the rotor wheel into an inlet air or external air section (46) and an outgoing air or expelled air section (47) in the form of a cylinder 45 concentric with the rotor wheel and rotating with it. In the case of this axial flow ventilator, the heat pipes form an integral part of the actual blade or blades as is also the case in the radial flow or cross flow ventilators. Plates or ribs may also be fitted to increase the surface area.

The arrangement may also be subject to construction designs not illustrated here, as a radial flow or axial flow pump, which may be used to pump fluid media and to act simultaneously as an energy recovery unit.

It is possible to arrange an adjustment facility, modifying the intensity of the heat transfer process, which consists of tilting the heat pipes out of their normal position, e.g. in the case of the radial flow or axial flow units the rotor wheel is tilted or the whole ventilator is tilted. The flow of condensate inside the pipe is increased, subdued or redirected by centrifugal force dependent upon the angle of tilt.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A fan, for conveying a liquid or gaseous flow medium, the fan comprising: a fan housing for guiding the flow medium and a fan impeller driven by a motor and supported rotatably within said housing for conveying the flow medium through the housing, said fan impeller including shaft means carrying a number of fan blades, which fan blades are located in sequence along the peripheral direction of said impeller, the length of the fan blades extending in one of the approximately radial and axial directions of the impeller, a partition wall within the impeller for separating a warmer exhaust-air stream of the flow medium, which exhaust-air stream goes through the housing, from a cooler outside-air stream which also goes through the housing and cooperates heat-exchangingly with the exhaust-air stream within the housing, the fan further comprising the improvement wherein each fan blade contains several heat pipes of radially symmetrical cross section, which heat pipes are parallel to one another and approximately parallel the length of the fan blade, said fan blade having a hollow profile shaped blade body in which said heat pipes are enclosed, said heat pipes being distributed evenly in the fan blade interior and spaced from each other along the width of the fan blade interior, namely spaced from each other in a direction transverse to the length of the fan blade, wherein the partition wall separates the fan housing into chambers which are separate from one another, which chambers each have a respective one of the two streams flowing through same, and which thereby make said two streams flow parallel to one another, the axial end portions of the heat pipes which rotate with the associated blade each being associated with a respective one of the two conveyor medium streams.

2. A fan according to claim 1, wherein the fan is constructed as a radial fan, in which the media streams which partake in the heat exchange are each sucked into the fan axially and centrally and are blown out radially.

3. A fan according to claim 2, wherein said radial flow fan is a double-flow fan and the space within the fan housing and fan impeller is divided, by a partition wall which extends at a right angle to the longitudinal axis of the impeller, into a first partial room which receives the supply, or outside, air and a second partial room which receives the exhaust, or discharge, air, wherein the two media streams are sucked in at the two outer ends of the impeller in opposite axial directions.

4. A fan according to claim 1, wherein the fan is constructed as a cross-flow fan, in which the medium streams which partake in the heat exchange are sucked in radially and are blown out radially after a deflection inside of the impeller.

5. A fan according to claim 4, wherein said cross flow fan is a double-flow fan and the space within the fan housing and fan impeller is divided, by a partition wall which extends at a right angle with respect to the longitudinal axis of the impeller, into a first partial room which receives the supply, or outside, air into a second partial room which receives the exhaust, or discharge, air, wherein the two media streams are sucked in at points which correspond with one another on the outer circumference of the impeller and are guided through the impeller and the housing in approximate parallelism to one another.

6. A fan according to one of claims 1 to 5, wherein the partition wall is at least approximately flat and substantially comprises a disk having a center portion which rotates with the impeller and projects radially beyond the impeller circumference and further having a ring-like outer portion which surrounds said center portion, said outer portion being mounted with its outer circumference on the inner side of the housing and overlapping with its inner circumference the outer circumference of said center portion with a labyrinthlike seal.

7. A fan according to claim 1, wherein said fan is constructed as an axial fan, in which the medium streams which partake in the heat exchange are each sucked in axially and in concentric alignment with one another and are blown out axially and again in concentric alignment with one another, wherein the heat pipes are aligned radially with respect to the axis of rotation of the impeller.

8. A fan according to claim 7, wherein said axial fan is a double-flow fan and the space within the fan housing and fan impeller is separated by a cylindrical partition wall, which rotates with the impeller and is concentric to said impeller, into a first partial room which receives the supply, or outside, air and a second partial room which receives the exhaust, or discharge, air, wherein one of the outside-air stream and discharge-air stream surrounds the other in a cylindrical arrangement and with the heat-emitting air stream on the outside.

9. A fan according to one of the claims 1 to 5, wherein for changing the intensity of the heat exchange, the heating pipes are tilted in that the impeller is tilted.

10. A fan according to claim 1, in which said heat pipes each comprise a circular cross section pipe of maximum outside diameter substantially less than the width of said blade.

11. A fan, for conveying a liquid or gaseous flow medium, the fan comprising: a fan housing for guiding the flow medium and a fan impeller driven by a motor and supported rotatably within said housing for conveying the flow medium through the housing, said fan impeller including shaft means carrying a number of fan blades, which fan blades are located in sequence along the peripheral direction of said impeller, the length of the fan blades extending in one of the approximately radial and axial directions of the impeller, a partition wall within the impeller for separating a warmer exhaust-air stream of the flow medium, which exhaust-air stream goes through the housing, from a cooler outside-air stream which also goes through the housing and cooperates heat-exchangingly with the exhaust-air stream within the housing, the fan further comprising the improvement wherein each fan blade contains several heat pipes, which heat pipes are parallel to one another and approximately parallel the length of the fan blade, said heat pipes being distributed evenly over the fan blade width and being housed in the fan blade, wherein the partition wall separates the fan housing into chambers which are separate from one another, which chambers each have a respective one of the two streams flowing through same, and which thereby make said two streams flow parallel to one another, the axial end portions of the heat pipes which rotate with the associated blade each being associated with a respective one of the two conveyor medium streams, wherein said fan blade comprises a hollow profile blade body having a pair of walls extending the width of the blade and running tangent to the heat pipes on substantially diametrically opposite sides of the latter, the thickness of the blade corresponding substantially to the diameter of the heat pipes therein, said heat pipes being spaced one from the next along the width of said walls, the axes of the heat pipes being arranged along a curve cross-sectionally curving the blade along its width, the leading and trailing ends of said blade being determined by two of said heat pipes, the remainder of said heat pipes of said blade being disposed in spaced apart relation between said two.

* * * * *

UNITED STATES PATENT AND TRADEMARK OFFICE
CERTIFICATE OF CORRECTION

PATENT NO. : 4 401 151                              Page 1 of 2
DATED : August 30, 1983
INVENTOR(S) : Wolfgang Pozsicsanyi It is certified that error appears in the above-identified patent and that said Letters Patent is hereby corrected as shown below:

Column 5, line 52; after "by a" insert ---said---.

line 66; after "by a" insert ---said---.

Column 6, line 28; after "cylindrical" insert ---said---.

Figure 1A should appear as shown on the attached page.

Signed and Sealed this

Thirteenth Day of March 1984

[SEAL]

Attest:

GERALD J. MOSSINGHOFF

Attesting Officer       Commissioner of Patents and Trademarks

UNITED STATES PATENT AND TRADEMARK OFFICE
CERTIFICATE OF CORRECTION

PATENT NO. : 4 401 151

DATED : August 30, 1983

INVENTOR(S) : Wolfgang Pozsicsanyi

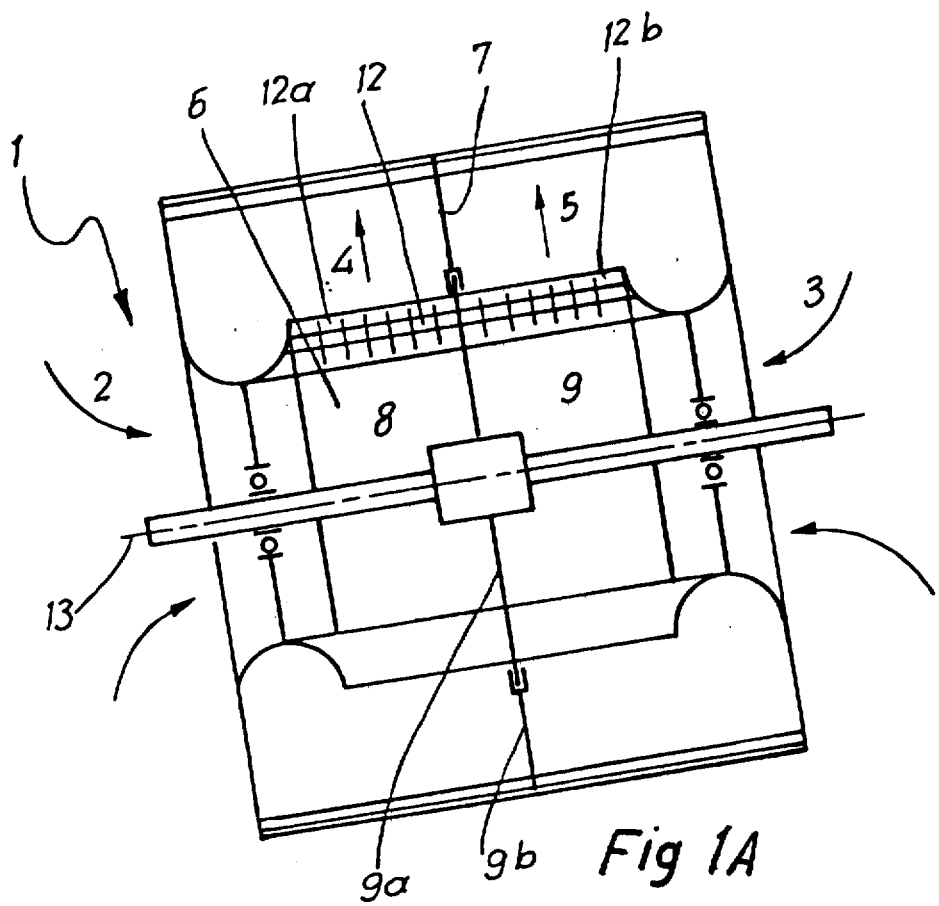

It is certified that error appears in the above-identified patent and that said Letters Patent is hereby corrected as shown below: